2,893,822

SEPARATION OF URANIUM FROM OTHER METALS

Herbert H. Hyman, Chicago, Ill., assignor to the United States of America as represented by the United States Atomic Energy Commission No Drawing. Application August 16, 1949
Serial No. 110,680

9 Claims. (Cl. 23—14.5)

This invention deals with the separation of uranium from other elements admixed therewith, such as ruthenium, zirconium, columbium, cerium and other rare earth metals.

Monazite sand and pitchblende, for instance, contain uranium admixed with one or the other metal of the above mentioned group. Especially in the case of monazite sand the problem is the maximum recovery of the relatively small quantities of uranium. Likewise, in the case of neutron-irradiated natural uranium, after the plutonium formed has been separated from the dissolved slug, the solution containing uranium and fission product elements, which include ruthenium, zirconium and cerium, has to be processed for the purpose of isolating the uranium.

In one process at present in use for the separation of uranium and plutonium, uranium is extracted and thereby separated from the plutonium by means of an organic solvent; this extraction is carried out from an aqueous solution containing a salting-out agent. The uranium, in that process, is then re-extracted from the organic solvent by means of water. The aqueous phase thus obtained, however, does not contain only the uranium, but it contains in addition thereto some of the fission products formed during irradiation and in particular ruthenium, cerium and zirconium. Thus, also in this specific instance, the separation of uranium from these metals listed is of prime importance. Likewise, in a so-called breeder pile, the thorium of the blanket produces $U^{233}$ part of which fissions so that also in this case the problem of separating $U^{233}$ from the fission product elements exists.

It is thus an object of this invention to provide a process for extracting uranium with increased efficiency and output as compared with processes hitherto used.

It is also an object of this invention to separate and purify uranium from such elements admixed with the uranium, such as ruthenium, zirconium, columbium, cerium and other rare earth metals.

It is another object of this invention to separate uranium from fission product values admixed therewith.

These and other objects are accomplished by adding hydrazine to an aqueous solution containing salts of uranium, preferably hexavalent uranium, and then treating the mixture with a substantially water-immiscible ketone; the ketone extracts the uranium salt. When contaminating elements are present, they substantially remain in the aqueous solution. The aqueous and solvent phases are then separated.

A reaction takes place between the ketone and the hydrazine whereby a complex, a ketazine, is formed; this complex has a greater power of extraction for uranium than the ketone by itself. Moreover, the hydrazine also has a reducing effect on, for instance, cerium and ruthenium, but not on the U (VI) salts, and thereby converts them to their lower valence states; by this, the extractability of cerium and ruthenium by the organic solvents is decreased so that the separation or decontamination is also improved when viewed from this angle.

While the mere addition of hydrazine brings about the results just set forth, the decontamination effect is still furthermore improved if the aqueous solution is heated with the hydrazine, for instance if it is subjected to a refluxing step for several hours.

Example I

In the following table the results of a number of experiments are compiled which were carried out with uranyl nitrate solutions obtained from a neutron-irradiated uranium slug by dissolution in nitric acid, followed by removal of plutonium. This table illustrates the increased efficiency of purification by extraction with hexone, i.e. methyl isobutyl ketone, when hydrazine was used.

For these experiments two units were used. Each unit consisted essentially of a rectangular stainless steel box, 27" x 4¼" x 4¼" and was divided into 15 compartments by transverse partitions, each compartment again being divided into mixing and settling zones and comprising one extraction stage. Passages were provided in the partitions to permit direct interstage flow, and the liquids contacted flowed by gravity countercurrently from stage to stage and concurrently from the mixing to the settling zone in each stage. An agitator was provided in each mixing zone.

One unit was used for the extraction of uranyl nitrate with hexone from an aqueous solution (in the ten first stages) and for scrubbing the hexone phase with a solution of aluminum nitrate (in the last five stages). All 15 stages of the second unit were used for the re-extraction of uranyl nitrate from the hexone phase by means of 0.1 M $HNO_3$.

The aqueous solutions employed had been obtained from the uranyl nitrate solution described above by solvent extracting the uranium, thereby separating it from the plutonium, and back extracting it with water. This aqueous solution, called hereinafter the "feed solution," in each case contained 2 M uranyl nitrate, while the acid content varied as shown in the table. The hexone introduced contained 0.5 M nitric acid in experiments numbered 1, 2 and 4, while in the cases of experiments numbered 3 and 5 it was free of nitric acid. The hexone had a flow rate that was four times as great as that of the feed solution. The scrub solution contained 1.3 M aluminum nitrate aqueous solution; it was introduced with a flow rate equal to that of the feed solution.

The aqueous solution leaving the second unit after re-extraction of uranyl nitrate was analyzed for uranium; likewise, its beta-activity as well as the specific activity due to ruthenium, the predominant fission product present, was determined. The results are expressed as the decontamination factor, which is the ratio of the beta-activity in the feed solution to the corresponding activity in the aqueous re-extraction phase as based on a unit weight of uranium.

| Experiment Number | $HNO_3$ Concentration of Feed Solution, M | Hydrazine Content of Feed Solution, M | Average Uranium Loss (Percent) | Over-all β-Decontamination Factor | Ru Decontamination Factor |
|---|---|---|---|---|---|
| 1 | 0.3 | | 3.2 | 3 | 3 |
| 2 | 0.14 | | 7.5 | 14 | 20 |
| 3 | 0.05 | | 8.2 | 24 | 60 |
| 4 | 0.26 | 0.1 | 3.3 | 45 | 150 |
| 5 | 0.005 | 0.1 | 9.9 | 40 | 70 |

The data show that, in the absence of hydrazine, the loss of uranium, which is the uranium retained by the aqueous phase after solvent extraction, increases with decreasing acidity; at the same time, however, the over-all beta-decontamination factor also increases with decreasing acidity in the feed solution so that from the point of view of uranium loss a high acidity is desirable, whereas beta-decontamination is favored by low acidity.

When hydrazine is used, the uranium loss is apparently reduced considering the acidities of the feed solutions. The over-all beta-decontamination factor was increased due to the presence of hydrazine. The increase was greater in Experiment 4 where the acidity was higher than in Experiment 5. Similar conclusions can be drawn with regard to ruthenium decontamination.

*Example II*

Another set of experiments was carried out with a feed solution having a $U^{VI}$ (as nitrate) concentration of 0.01 M, one run being carried out without any hydrazine, the other run with the addition of 0.1 M $N_2H_4 \cdot H_2O$. In these continuous counter-current experiments the uranyl nitrate solution was introduced into an extraction column in about the middle thereof, while the hexone was introduced at or near its bottom. The scrub solution entered the column at the top section. The solvent extract phase, after withdrawal from the top of the column, was treated countercurrently in a second column with dilute aqueous nitric acid for re-extraction of the uranium.

In both experiments the concentrations were as follows: 1.13 M $Al(NO_3)_3$ and 0.75 M $HNO_3$ for the aqueous feed solution; 0.5 M $Al(NO_3)_3$ and 0.2 M $HNO_3$ for the aqueous scrubbing solution; 0.5 M $HNO_3$ in the hexone used, and 0.1 M $HNO_3$ in the aqueous re-extracting solution. The flow rates of the respective solutions, in cc./minute, were: 30 (feed solution), 7.5 (scrub solution), 37.5 (hexone) and 5 (re-extracting medium).

Both the aqueous solutions, namely, that leaving the first, extracting column and that leaving the second, re-extracting column were analyzed for their content in uranium and beta- and gamma-activities which were indicative of the uranium loss and decontamination efficiency, respectively. While, without hydrazine, the aqueous phase leaving the first extraction column contained up to 4% uranium and the hexone leaving the re-extracting column contained up to 3%, the corresponding losses, when 0.1 M hydrazine was employed in the feed solution, were consistently as low as 0.1% and 0.5% respectively. Likewise, while without hydrazine, the beta-decontamination factor (=quantity of fission product elements in feed solution/quantity of fission product elements in the aqueous extract from the second column) ranged from 30 to 100 and the gamma-decontamination factor was found to be 100, the use of hydrazine increased both decontamination factors to values from 500 to 1000.

In other experiments it was found that the use of hydrazine increased the distribution coefficient (hexone/aqueous solution) of uranium from about 3 to 20 or even more, when a salting-out agent was present in the aqueous solution. When the aqueous solution contained dilute nitric acid, the uranium distribution coefficient was only 0.02 in the absence of hydrazine and as high as 1 in the presence of hydrazine.

The concentration of nitric acid in the feed solution, for the process of this invention, is preferably maintained between 0.005 M and 1 M; however the best results were obtained with a concentration ranging from 0.1 M to 0.5 M.

All water-immiscible ketones are suitable for the process of this invention. For instance methyl n-amyl ketone, acetophenone, mesityl oxide, and cyclohexanone have been found satisfactory. The best results however were obtained with methyl isobutyl ketone or hexone.

It will be understood that while there have been described herein certain specific embodiments of the invention, it is not intended thereby to have the invention limited to the specific details given in view of the fact that the invention is susceptible to various modifications and changes which come within the spirit of the disclosure and the scope of the appended claims.

1. A process for extracting uranium from an acid aqueous solution of a uranium salt, comprising adding hydrazine to said solution, extracting said uranium salt by means of a substantially water-immiscible ketone, and separating a ketone extract phase from an aqueous phase.

2. A process for extracting uranium from an acid aqueous solution of a uranyl salt, comprising adding hydrazine to said solution, extracting said uranium salt by means of a substantially water-immiscible ketone, and separating a ketone extract phase from an aqueous phase.

3. A process for extracting uranium from an acid aqueous solution of a uranyl nitrate, comprising adding hydrazine to said solution, extracting said uranium salt by means of a substantially water-immiscible ketone, and separating a ketone extract phase from an aqueous phase.

4. A process for extracting uranium from an acid aqueous solution of a uranyl nitrate, comprising adding hydrazine to said solution, extracting said uranium salt by means of hexone, and separating a hexone extract phase from an aqueous phase.

5. A process for separating uranium from at least one metal of the group consisting of ruthenium, zirconium, columbium and rare earth metals, said metal being admixed with said uranium as salts in an acid aqueous solution, said process comprising adding hydrazine to said solution, extracting said uranium salt by means of a substantially water-immiscible ketone, and separating a ketone extract phase from an aqueous phase.

6. A process for separating uranium from fission product elements from an acid aqueous solution containing salts of said elements together with a uranyl salt, comprising adding hydrazine to said aqueous solution, refluxing the mixture obtained at elevated temperature, extracting said uranium salt by means of a substantially water-immiscible ketone, and separating a ketone extract phase from an aqueous phase.

7. The process of claim 6 wherein the ketone is hexone and the uranium salt is uranyl nitrate.

8. The process of claim 6 wherein the aqueous solution to be treated is a nitric acid solution of a concentration of from 0.005 M to 1 M, the ketone is hexone, and the uranium salt is uranyl nitrate.

9. The process of claim 6 wherein the aqueous solution to be treated is a nitric acid solution of a concentration of from 0.1 to 0.5 M, the ketone is hexone, and the uranium salt is uranyl nitrate.

References Cited in the file of this patent

UNITED STATES PATENTS 2,227,833    Hixson et al.    Jan. 7, 1941